United States Patent
Park et al.

(10) Patent No.: US 11,817,265 B2
(45) Date of Patent: Nov. 14, 2023

(54) DIELECTRIC CERAMIC COMPOSITION AND MULTILAYER CERAMIC CAPACITOR COMPRISING THE SAME

(71) Applicant: SAMSUNG ELECTRO-MECHANICS CO., LTD., Suwon-si (KR)

(72) Inventors: Jeong Yun Park, Suwon-si (KR); Jae Sung Park, Suwon-si (KR); Kyung Sik Kim, Suwon-si (KR); Ji Hong Jo, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

(21) Appl. No.: 17/959,961

(22) Filed: Oct. 4, 2022

(65) Prior Publication Data
US 2023/0049469 A1 Feb. 16, 2023

Related U.S. Application Data

(63) Continuation of application No. 16/774,651, filed on Jan. 28, 2020, now Pat. No. 11,501,918.

(30) Foreign Application Priority Data

Jul. 24, 2019 (KR) .................. 10-2019-0089740

(51) Int. Cl.
*H01G 4/12* (2006.01)
*C04B 35/468* (2006.01)

(52) U.S. Cl.
CPC ......... *H01G 4/1227* (2013.01); *C04B 35/468* (2013.01); *C04B 35/4682* (2013.01); *C04B 2235/40* (2013.01)

(58) Field of Classification Search
CPC .......... H01G 4/1227; C04B 35/468; C04B 35/4682; C04B 2235/40; C04B 2235/3206; C04B 2235/3227
See application file for complete search history.

(56) References Cited

U.S. PATENT DOCUMENTS

| 5,432,136 A | 7/1995 | Shibata et al. |
| 8,116,065 B2 | 2/2012 | Nakamura et al. |

(Continued)

FOREIGN PATENT DOCUMENTS

| CN | 1356704 A | 7/2002 |
| CN | 1432548 A | 7/2003 |

(Continued)

OTHER PUBLICATIONS

Chinese Office Action dated Aug. 2, 2022, issued in corresponding Chinese Patent Application No. 202010342515.5.

*Primary Examiner* — Karl E Group
*Assistant Examiner* — Cameron K Miller
(74) *Attorney, Agent, or Firm* — Morgan, Lewis & Bockius LLP

(57) ABSTRACT

A dielectric ceramic composition includes a barium titanate ($BaTiO_3$)-based base material main ingredient and an accessory ingredient, the accessory ingredient including dysprosium (Dy) and praseodymium (Pr) as first accessory ingredients. A content of the Pr satisfies 0.233 mol≤Pr≤0.699 mol, based on 100 mol of the barium titanate base material main ingredient.

19 Claims, 2 Drawing Sheets

(56) References Cited

U.S. PATENT DOCUMENTS

| | | |
|---|---|---|
| 2002/0098969 A1 | 7/2002 | Nakamura et al. |
| 2004/0038800 A1 | 2/2004 | Horie et al. |
| 2005/0122639 A1 | 6/2005 | Okamatsu et al. |
| 2007/0135295 A1 | 6/2007 | Sasabayashi et al. |
| 2008/0030921 A1 | 2/2008 | Kaneda et al. |
| 2010/0014210 A1* | 1/2010 | Nakamura ........... H01G 4/1227 252/62.3 BT |
| 2016/0155570 A1 | 6/2016 | Shimada et al. |
| 2016/0163458 A1 | 6/2016 | Park et al. |
| 2017/0186543 A1 | 6/2017 | Park et al. |
| 2017/0190626 A1 | 7/2017 | Yoon et al. |

FOREIGN PATENT DOCUMENTS

| | | |
|---|---|---|
| CN | 1697789 A | 11/2005 |
| CN | 101006028 A | 7/2007 |
| CN | 105669192 A | 6/2016 |
| CN | 106915959 A | 7/2017 |
| CN | 106941045 A | 7/2017 |
| JP | 2008-042150 A | 2/2008 |
| JP | 2016-102040 A | 6/2016 |

\* cited by examiner

I-I'

DIELECTRIC CERAMIC COMPOSITION AND MULTILAYER CERAMIC CAPACITOR COMPRISING THE SAME

CROSS-REFERENCE TO RELATED APPLICATION(S)

This application is the continuation application of U.S. patent application Ser. No. 16/774,651 filed on Jan. 28, 2020, which claims benefit of priority to Korean Patent Application No. 10-2019-0089740 filed on Jul. 24, 2019 in the Korean Intellectual Property Office, the disclosure of which is incorporated herein by reference in its entirety.

TECHNICAL FIELD

The present disclosure relates to a dielectric ceramic composition and a multilayer ceramic electronic component including the same.

BACKGROUND

In general, electronic components using a ceramic material such as a capacitor, an inductor, a piezoelectric element, a varistor, a thermistor, or the like, include a ceramic body formed of a ceramic material, internal electrodes formed in the body and external electrodes mounted on a surface of the ceramic body to be connected to the internal electrodes.

As there is a recent trend for electronic products to be miniaturized and multifunctionalized along with chip components, there is a need for multilayer ceramic capacitors which are smaller in size but which have greater capacity.

A method of both miniaturizing a multilayer ceramic capacitor and increasing the capacity thereof simultaneously is to reduce thicknesses of the internal dielectric layers and electrode layers to laminate a larger number of the layers. Currently, the thickness of the internal dielectric layer is about 0.6 µm, and there have been efforts to develop thinner dielectric layers.

Under such circumstances, ensuring reliability of dielectric layers is emerging as a major issue of dielectric materials. In addition, difficulties in managing quality and yield have become issues due to increased degradation of insulation resistance of dielectric materials.

To address such issues, there is a need to develop a new method for ensuring high reliability with respect not only to a structure of a multilayer ceramic capacitor, but also to a dielectric composition.

When a dielectric composition capable of improving the current reliability is secured, a thinner multilayer ceramic capacitor can be manufactured.

SUMMARY

An aspect of the present disclosure is to provide a dielectric ceramic composition, capable of improving reliability, and a multilayer ceramic capacitor including the same.

According to an aspect of the present disclosure, a dielectric ceramic composition includes a barium titanate (BaTiO$_3$)-based base material main ingredient and an accessory ingredient, the accessory ingredient including dysprosium (Dy) and praseodymium (Pr) as first accessory ingredients. A content of the Pr satisfies 0.233 mol %≤Pr≤0.699 mol %, based on 100 mol % of the barium titanate base material main ingredient.

According to another aspect of the present disclosure, a multilayer ceramic capacitor includes a ceramic body including dielectric layers and first and second internal electrodes disposed to face each other with respective dielectric layers interposed therebetween, and a first external electrode and a second external electrode disposed on external surfaces of the ceramic body, the first external electrode being connected to the first internal electrode and the second external electrode being connected to the second internal electrode. The dielectric layers include dielectric grains comprising a dielectric ceramic composition. The dielectric ceramic composition comprises a barium titanate (BaTiO$_3$)-based base material main ingredient and an accessory ingredient, the accessory ingredient comprising dysprosium (Dy) and praseodymium (Pr) as first accessory ingredients. A content of the Pr satisfies 0.233 mol %≤Pr≤0.699 mol %, based on 100 mol % of the barium titanate base material main ingredient.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
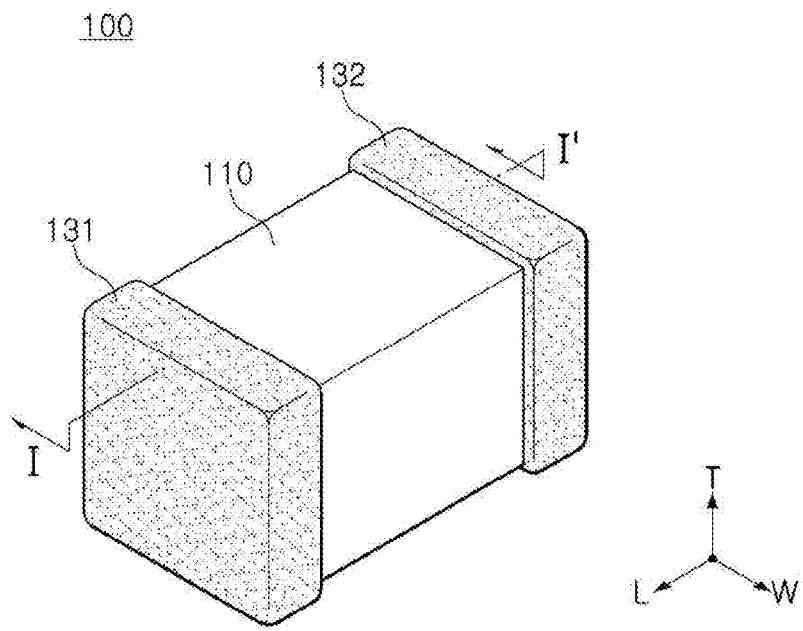
FIG. 1 is a schematic perspective view of a multilayer ceramic capacitor according to an example in the present disclosure.

Hereinafter, embodiments of the present disclosure will be described as follows with reference to the attached drawings. The present disclosure may, however, be embodied in many different forms and should not be construed as being limited to the embodiments set forth herein. Rather, these embodiments are provided so that the present disclosure will be thorough and complete, and will fully convey the scope of the present disclosure to those skilled in the art. In the drawings, the shapes and dimensions of elements may be exaggerated for clarity, and the same reference numerals will be used throughout to designate the same or like elements.

FIG. 1 schematic perspective view of a multilayer ceramic capacitor according to an embodiment in the present disclosure.

Figure 2:
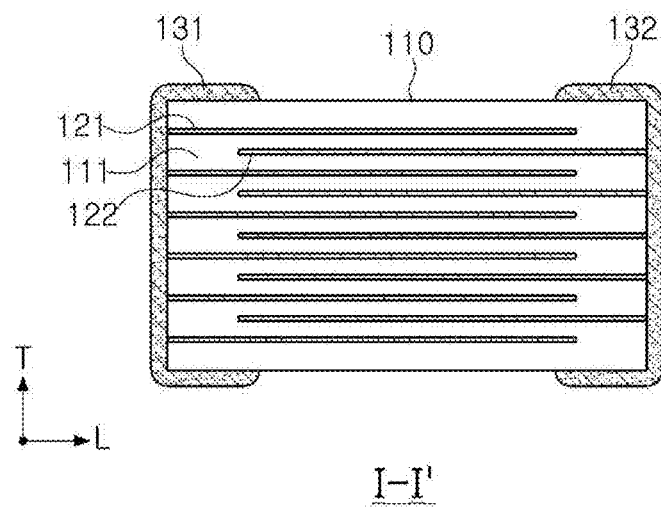
FIG. 2 is a cross-sectional view taken along line I-I' of FIG. 2.

FIG. 2 is a cross-sectional view taken along line I-I' of FIG. 1.

Referring to FIGS. 1 and 2, a multilayer ceramic capacitor 100 according to an embodiment includes a ceramic body 110 including dielectric layers 111 and first and second internal electrodes 121 and 122 disposed to face each other with respective dielectric layers interposed therebetween and first and second external electrodes 131 and 132 disposed on external surfaces of the ceramic body 110. The first external electrode 131 is electrically connected to the first internal electrode 121 and the second external electrode 132 is electrically connected to the second internal electrode 122.

In regard to the multilayer ceramic capacitor 100 according to an embodiment, the "length direction," "width direction," and "thickness direction" will be defined as an "L" direction, a "W" direction, and a "T" direction, respectively.

The "thickness direction" may be used in the same sense as a direction in which the dielectric layers are stacked up, for example, a "lamination direction."

Although not limited to a specific shape, a configuration of the ceramic body 110 may be a rectangular cuboid shape as illustrated in the drawing.

A plurality of the internal electrodes 121 and 122, formed inside the ceramic body 110, have one end exposed to one surface of the ceramic body 110 or the other surface thereof disposed to oppose the one surface.

The internal electrodes 121 and 122 may include a first internal electrode 121 and a second internal electrode 122, having polarities opposite to each other, in pairs.

One end of the first internal electrode 121 may be exposed to one surface of the ceramic body, and one end of the second internal electrode 122 may be exposed to the other surface disposed to oppose the one surface thereof.

The first and second external electrodes 131 and 132 are disposed on the one surface and the other surface of the ceramic body 110, disposed to oppose each other, to be electrically connected to the internal electrodes.

Materials of the first and second internal electrodes 121 and 122 are not limited, and may be a conductive paste including at least one of, for example, silver (Ag), lead (Pb), platinum (Pt), nickel (Ni) or copper (Cu).

The first and second external electrodes 131 and 132 may be electrically connected to the first and second internal electrodes 121 and 122 to form capacitance. The second external electrode 132 may be connected to an electric potential different from a potential connected to the first external electrode 131.

A conductive material, included in the first and second external electrodes 131 and 132, is not limited, but may be nickel (Ni), copper (Cu), or alloys thereof.

Thicknesses of the first and second external electrodes 131 and 132 may be appropriately determined depending on uses thereof, or the like, and are not limited, but may be, for example, 10 μm to 50 μm.

According to an embodiment, a material of the dielectric layers 111 is not limited as long as sufficient capacitance may be obtained, and may be, for example, barium titanate ($BaTiO_3$) powder particles.

The material of the dielectric layers 111 may include various additives, organic solvents, plasticizers, binders, dispersants, and the like, added to $BaTiO_3$ powder particles, or the like.

The dielectric layers 111, in a sintered state, may be integrated with each other such that boundaries between adjacent dielectric layers 111 may not be readily apparent.

The first and second internal electrodes 121 and 122 may be formed on the dielectric layers 111, and the internal electrodes 121 and 122 may be formed inside the ceramic body 110 with a dielectric layer interposed therebetween by sintering.

A thickness of the dielectric layer 111 may optionally vary, depending on capacity design of the capacitor. In an embodiment, a thickness of each dielectric layer after sintering may be, in detail, 0.4 μm or less.

In addition, a thickness of each of the first and second internal electrodes 121 and 122 after the sintering may be, in detail, 0.4 μm or less.

According to an embodiment, the dielectric layers 111 include dielectric grains including a dielectric ceramic composition, and the dielectric ceramic composition includes a barium titanate ($BaTiO_3$)-based base material main ingredient and an accessory ingredient, where the accessory ingredient includes dysprosium (Dy) and praseodymium (Pr) as first accessory ingredients. A content of the Pr satisfies $0.233$ mol $\% \leq Pr \leq 0.699$ mol %, based on 100 mole % of the base material main ingredient.

Recently, to develop an ultra-small high-capacitance multilayer ceramic capacitor, it is necessary to develop a composition of a dielectric composition which may implement a high dielectric constant by improving domain wall mobility when grains having the same size are formed in a $BaTiO_3$-based base material main ingredient in which an additive is employed.

There are research results that, when a donor-type dopant composition is applied, concentration of a pinning source in a lattice is reduced to facilitate movement between domains.

To this end, additives having an ion size most similar to an ion size of barium (Ba), among known donor-type dopants, may be applied to significantly reduce latch mismatching and to develop a dielectric composition allowing high-k dielectric characteristics to be implemented.

In general, when the donor-type additive is increased in content, insulation resistance (IR) is lowered and it is difficult to secure reduction in resistance. Therefore, an appropriate content ratio intends to be selected.

A most commonly used donor-type dopant, having an effect on improvement of a dielectric constant and reliability of a multilayer ceramic capacitor, is dysprosium (Dy). The donor-type dopant and an acceptor-type dopant may be appropriately adjusted to implement desired dielectric characteristics and reliability.

The present inventor invented a dielectric composition including praseodymium (Pr) as +3 or more valence rare-earth elements to chemically inhibit formation of oxygen vacancies, an oxygen defect, and to lower a concentration thereof.

A praseodymium (Pr) element is effectively substituted to be employed in a site of a barium (Ba) element because the Pr element has an ionic radius approximately between an ionic radius of the Ba element, a main element, and an ionic radius of the dysprosium (Dy) element, a donor-type dopant.

In an embodiment, a Pr element is applied together with a Dy element exhibiting stable dielectric characteristics, and an optimal content ratio is selected to secure a high-k dielectric constant and improve reliability.

According to an embodiment, a dielectric ceramic composition includes a $BaTiO_3$-based base main ingredient and an accessory ingredient, and the accessory ingredient includes dysprosium (Dy) and praseodymium (Pr) as first accessory ingredients. The content of praseodymium (Pr) satisfies $0.233$ mol $\% \leq Pr \leq 0.699$ mol %, based on 100 mol % of the base material main ingredient.

The content of praseodymium (Pr) may be adjusted to satisfy $0.233$ mol $\% \leq Pr \leq 0.699$ mol %, based on 100 mol % of the base material main ingredient. Thus, a high-k dielectric constant may be secured and reliability improvement, such as improved insulation resistance, may be achieved.

According to an embodiment, a dielectric ceramic composition, in which a dielectric layer is included in a ceramic body, includes dysprosium (Dy) and praseodymium (Pr), rare-earth elements, as accessory ingredients. Contents of dysprosium (Dy) and praseodymium (Pr) may be controlled to secure high-k dielectric constant and to achieve reliability improvement, such as improved insulation resistance.

When the content of praseodymium (Pr) is less than 0.233 mol % based on 100 mol % of the base material main ingredient, an effect of increasing the dielectric constant is not great as compared to a case in which only dysprosium (Dy) is included.

When the content of praseodymium (Pr) is higher more than 0.699 mol % based on 100 mol % of the base material main ingredient, insulation resistance may be decreased due to semiconductorization.

According to an embodiment, the total content of the dysprosium (Dy) and praseodymium (Pr) may be 1.0 mol % or less based on 100 mol % of the base material main ingredient.

In general, as the total content of a rare-earth element is increased, it is more advantageous in terms of reliability but temperature characteristics are deteriorated while Tc moves to a room temperature. Therefore, the contents of dysprosium (Dy) and praseodymium (Pr) may be adjusted to be, in detail, less than 1.0 mol % based on 100 mol % of the base material main ingredient.

When the content of the dysprosium (Dy) and praseodymium (Pr) is higher than 1.0 mol % based on 100 mol % of the base material main ingredient, the temperature characteristics such as temperature coefficient of capacitance (TCC) may be deteriorated.

According to an embodiment, the first accessory ingredient further includes an oxide or carbonate including lanthanum (La), and the lanthanum (La) may be disposed at a grain boundary of the dielectric grain.

When a rare-earth elements having a larger ionic radius than dysprosium (Dy), for example, lanthanum (La) is used, lanthanum (La) may effectively substitute a site of barium (Ba). Therefore, it is more effective to decrease oxygen vacancy defect concentration.

Accordingly, in order to improve reliability, lanthanum (La) may be further included as the first accessory ingredient to secure insulation resistance while significantly decreasing the oxygen vacancy defect concentration.

However, when the content of lanthanum (La) is excessive, insulation resistance is rapidly reduced due to excessive semiconductorization. Therefore, the content of lanthanum (La) may be, in detail, 0.233 mol % or more and 0.699 mol % or less based on 100 mol % of the base material main ingredient.

As described above, the multilayer ceramic capacitor 100 according to an embodiment is an ultra-small high-capacitance product, the dielectric layer 111 has a thickness of 0.4 μm or less, and each of the first and second internal electrodes 121 and 122 has a thickness of 0.4 μm or less. However, thicknesses thereof are not limited thereto.

In addition, a size of the multilayer ceramic capacitor 100 may be 1005 (length×width, 1.0 mm×0.5 mm) or less.

For example, since the multilayer ceramic capacitor 100 according to an embodiment is an ultra-small high-capacitance product, each of the dielectric layer 111 and the first and second internal electrodes 121 and 122 has a thickness lower than that of a product according to a prior art. In the case of a product to which a thin dielectric layer and a thin internal electrode are applied, a study for reliability improvement such as insulation resistance improvement is a very important issue.

For example, since a multilayer ceramic capacitor according to prior art includes a dielectric layer and an internal electrode having thicknesses higher than those of a dielectric layer and an internal electrode of a multilayer ceramic capacitor according to an example, reliability is not significantly problematic even when a composition of a dielectric ceramic composition is the same as the a composition according to the prior art.

However, in a product to which a thin dielectric layer and a thin internal electrode are applied as in an embodiment, reliability of a multilayer ceramic capacitor is important and, to this end, a composition of a dielectric ceramic composition needs to be adjusted.

For example, in an embodiment, dysprosium (Dy) and praseodymium (Pr) are included, as first accessory ingredients, in an amount of 1.0 mol % or less based on 100 mol % of the base material main ingredient, and the content of praseodymium (Pr) is adjusted to satisfy 0.233 mol % Pr 0.699 mol % based on 100 mol % of the base material main ingredient. Thus, reliability improvement such as insulation resistance improvement may be achieved even in the case in which the dielectric layer 111 is a thin film having a thickness of 0.4 μm or less.

However, the "thin film" does not refer to the fact each of the dielectric layer 111 and the first and second internal electrodes 121 and 122 has a thickness of 0.4 μm or less, and may be construed that the dielectric layer 111 and the first and second internal electrodes 121 and 122 have thicknesses less than thicknesses of those of a product according to prior art.

Hereinafter, each component of a dielectric ceramic composition according to an embodiment will be described in further detail.

(A) Base Material Main Ingredient

A dielectric ceramic composition according to an embodiment may include a base material main ingredient represented by $BaTiO_3$.

According to an embodiment, the base material main ingredient includes one selected from the group consisting of $(Ba_{1-x}Ca_x)(Ti_{1-y}Ca_y)O_3$ (where $0 \leq x \leq 0.3$ and $0 \leq y \leq 0.1$), $(Ba_{1-x}Ca_x)(Ti_{1-y}Zr_y)O_3$ (where $0 \leq x \leq 0.3$ and $0 \leq y \leq 0.5$), and $Ba(Ti_{1-y}Zr_y)O_3$ ($0 < y \leq 0.5$), but not limited thereto.

A dielectric ceramic composition according to an embodiment may have a room temperature dielectric constant of 2000 or more.

The base material main ingredient is not limited, but an average grain diameter of main ingredient powder particles may be 40 nm or more and 150 nm or less.

(B) First Accessory Ingredient

According to an embodiment, the dielectric ceramic composition essentially includes dysprosium (Dy) and praseodymium (Pr) as first accessory ingredients, and may further include a lanthanum (La) oxide or carbonate of 0.233 mol % or more and 0.699 mol % or less based on 100 mol % of the base material main ingredient.

The first accessory ingredient may serve to prevent deterioration in reliability of a multilayer ceramic capacitor to which a dielectric ceramic composition according to an embodiment is applied.

When the content of lanthanum (La) is less than 0.233 mol % based on 100 mol % of the base material main ingredient, there is no effect of improving a dielectric constant. When the content of lanthanum (La) is higher than 0.699 mol % based on 100 mol % of the base material main ingredient, insulation resistance may be decreased or a dissipation factor may be decreased.

According to an embodiment, the first accessory ingredient may include dysprosium (Dy) and praseodymium (Pr) in an amount of 1.0 mol % or less based on 100 mol % of the base material main ingredient, and the content of praseodymium (Pr) may be adjusted to satisfy 0.233 mol % $\leq Pr \leq$ 0.699 mol % based on 100 mol % of the base material main ingredient. Thus, reliability improvement such as insulating resistance improvement, or the like, may be achieved even when the dielectric layer 111 is a thin film having a thickness of 0.4 μm or less.

When the content of the praseodymium (Pr) is less than 0.233 mol % based on 100 mol % of the base metal main ingredient, the effect of increasing the dielectric constant is not great as compared to a case of the prior art including only dysprosium (Dy).

When the content of praseodymium (Pr) is higher than 0.699 mol % based on 100 mol % of the base material main ingredient, insulation resistance may be decreased due to semiconductorization.

(C) Second Accessory Ingredient

According to an embodiment, the dielectric ceramic composition may include an oxide or carbonate, including at least one of Mn, V, Cr, Fe, Ni, Co, Cu, or Zn, as a second accessory ingredient.

As the second accessory ingredient, an oxide or carbonate including at least one of Mn, V, Cr, Fe, Ni, Co, Cu, or Zn may be included in an amount of 0.1 to 2.0 mole % based on 100 mole % of the base material main ingredient.

The second accessory ingredient may serve to decrease a sintering temperature of the multilayer ceramic capacitor, to which the dielectric ceramic composition is applied, and to improve high-temperature withstand voltage characteristics.

The content of the second accessory ingredient and contents of third to fourth accessory ingredients, described later, may be defined as an included amount thereof based on 100 moles of base material powder particles, in detail, as moles of metal ions included in each accessory ingredient.

When the content of the second accessory ingredient is less than 0.1 mole % based on 100 mole % of the base material main ingredient, the sintering temperature may be increased and high-temperature withstand voltage characteristics may be slightly deteriorated.

When the content of the second accessory ingredient is higher than 2.0 mole % based on 100 mole % of the base material main ingredient, high-temperature withstand voltage characteristics and room temperature resistivity may be lowered.

In detail, the dielectric ceramic composition according to an embodiment may include a second accessory ingredient having a content of 0.1 to 2.0 mole % based on 100 mole % of the base material main ingredient. Thus, low-temperature sintering may be performed and high-temperature withstand voltage characteristics may be obtained.

(D) Third Accessory Ingredient

According to an embodiment, the dielectric ceramic composition may include a third accessory ingredient, which is an oxide or carbonate including a fixed-valence acceptor element of magnesium (Mg).

The fixed-valence acceptor element of Mg may include 0.001 to 0.5 mole % of a third accessory ingredient based on 100 mole % of the base material main ingredient.

The third accessory ingredient is a fixed-valence acceptor element and compounds including the same, and may serve as an acceptor to decrease electron concentration. By adding 0.001 to 0.5 mole % of the fixed-valence acceptor element of Mg, the third accessory ingredient, based on 100 mole % of the base material main ingredient, a reliability improvement effect, obtained by n-typification, may be significantly increased.

When the content of the third accessory ingredient is higher than 0.5 mole % based on 100 mole % of the base material main ingredient, a dielectric constant may be lowered, which is not favored.

According to an embodiment, for example, 0.5 mole % of the third accessory ingredient may be added based on 100 mole % of titanium (Ti) to significantly increase the reliability improvement effect obtained by n-typification. However, a content of the third accessory ingredient is not limited thereto, and the third accessory ingredient may be added in a small amount of 0.5 mole % or less or in an amount of 0.5 mol % based on 100 mole % of titanium (Ti).

(E) Fourth Accessory Ingredient

According to an embodiment, the dielectric ceramic composition may include an oxide, including at least one of silicon (Si) or aluminum (Al), or a glass compound, including Si, as a fourth accessory ingredient.

The dielectric ceramic composition may further include 0.001 to 4.0 mole % of a fourth accessory ingredient, an oxide including at least one of Si or Al or a glass compound including Si, based on 100 mole % of the base material main ingredient.

A content of the fourth accessory ingredient may be based on the content of at least one of Si or Al, included in the fourth accessory ingredient, without distinguishing an addition form such as a glass, an oxide, or a carbonate.

The fourth accessory ingredient may serve to decrease a sintering temperature of the multilayer ceramic capacitor, to which the dielectric ceramic composition is applied, and to improve high-temperature withstand voltage characteristics.

When the content of the fourth accessory ingredient is higher than 4.0 moles based on 100 moles of the base material main ingredient, sinterability and density may be lowered and a secondary phase may be generated, which is not favored.

In detail, according to an embodiment, the dielectric ceramic composition may include aluminum (Al) in an amount of 4.0 moles or less. Thus, grain growth may be uniformly controlled to be effective in improving withstand voltage characteristics and reliability, and improving DC-bias characteristics.

Hereinafter, the present disclosure will be described more fully with reference to embodiment and comparative examples, which are intended to help detailed understanding of the present disclosure, but the scope of the present disclosure is not limited by the embodiments.

EMBODIMENTS

In an embodiment, a dielectric layer may be formed by adding an organic solvent such as an additive, for example, Dy, Pr, La, Al, Mg, Mn, or the like, a binder, ethanol, or the like, to dielectric material powder particles including barium titanate ($BaTiO_3$) powder particles, performing wet mixing to prepare dielectric slurry, and applying and drying the dielectric slurry on a carrier film to form a ceramic green sheet.

In this case, each of the additives of all elements had a size of 40% or less, compared to barium titanate, and was monodispersed to 40% or less to be added.

In detail, the content of dysprosium (Dy) and praseodymium (Pr), among rare-earth elements, was less than 1.0 mol % based on 100 mol % of the base material main ingredient.

The embodiments include Embodiment 1, Embodiment 2, and Embodiment 3. In Embodiment 1, a ceramic green sheet was formed by adding 0.699 mol % of dysprosium (Dy) and 0.233 mol % of praseodymium (Pr). In Embodiment 2, a ceramic green sheet was formed by adding 0.466 mol % of dysprosium (Dy) and 0.466 mol % of praseodymium (Pr). In Embodiment 3, a ceramic green sheet was formed by adding 0.233 mol % of dysprosium (Dy) and 0.699 mol % of praseodymium (Pr).

The ceramic green sheet may be formed by mixing ceramic powder particles, a binder, and a solvent to prepare slurry and manufacturing the slurry in the form of a sheet having a thickness of several micrometers (μm) using a doctor blade method.

Then, a conductive paste for internal electrodes was prepared. The conductive paste may include nickel powder particles 40 parts by weight to 50 parts by weight of nickel powder having an average particle size of 0.1 μm to 0.2 μm.

The conductive paste for internal electrodes was applied onto the ceramic green sheets using a screen-printing method to form internal electrodes. The green sheets, on which internal electrode patterns were formed, were laminated to form a laminate followed by compressing and cutting the laminate.

Then, the cut laminate was heated to remove the binder, and sintered in a high-temperature reducing atmosphere to form a ceramic body.

During the sintering process, a heat treatment was performed by sintering in a reducing atmosphere (0.1% $H_2$/99.9% $N_2$, $H_2O/H_2/N_2$ atmosphere) at 1100° C. to 1200° C. for 2 hours followed by reoxidation in a nitrogen ($N_2$) atmosphere at 1000° C. for 3 hours.

A copper (Cu) paste was used to perform a termination process and electrode sintering on the sintered ceramic body, and external electrodes were formed.

In addition, each of the dielectric layers 111 and the first and second internal electrodes 121 and 122 inside the ceramic body 110 was formed to have a thickness of 0.4 μm or less after sintering.

Comparative Example 1

In the case of Comparative Example 1, an example according to a prior art, dysprosium (Dy) was added in 0.932 mol % based on 100 mol % of a base material main ingredient and the other manufacturing processes are the same as described in the above embodiment.

Comparative Example 2

In the case of Comparative Example 1, praseodymium (Pr) was added in 0.932 mol % based on 100 mol % of a base material main ingredient and the other manufacturing processes are the same as described in the above embodiment.

Dielectric constant, dissipation factor (DF), and insulation resistance (IR) were tested on Embodiments 1 to 3 and Comparative Examples 1 to 2, which are the prototype multilayer ceramic capacitor (MLCC) samples completed as described above, and results thereof were evaluated.

The tests were performed under three conditions, respectively. The conditions for TEST1, TEST2, and TEST3 were 1140° C. (average 1135° C.), 1160° C. (average 1157° C.) and 1180° C. (average 1172° C.), respectively.

Table 1 lists a dielectric constant, a dissipation factor (DF), and insulation resistance (IR) of a prototype multilayer ceramic capacitor (MLCC) chip according to Experimental Example (Examples 1 to 3 and Comparative Examples 1 and 2).

TABLE 1

| | TEST1 | | | TEST2 | | | TEST3 | | |
|---|---|---|---|---|---|---|---|---|---|
| | DC | DF | IR | DC | DF | IR | DC | DF | IR |
| Comp. Ex. 1 | 2,277 | 1.9% | 6.5E+12 | 2,433 | 2.3% | 6.7E+12 | 2,396 | 1.9% | 6.4E+12 |
| Emb. 1 | 2,572 | 1.8% | 4.04E+12 | 2,641 | 1.9% | 4.0E+12 | 2,660 | 1.7% | 3.7E+12 |
| Emb. 2 | 2,954 | 2.0% | 1.69E+12 | 2,992 | 2.1% | 1.7E+12 | 3,000 | 1.9% | 1.6E+12 |
| Emb. 3 | 3,315 | 2.3% | 1.25E+12 | 3,314 | 2.4% | 1.1E+12 | 3,333 | 2.3% | 1.1E+12 |
| Comp. Ex. 2 | 4,057 | 4.1% | 5.91E+11 | 3,986 | 4.0% | 5.7E+11 | 4,025 | 4.2% | 5.3E+11 |

DF: Dissipation Factor/IR: Insulation Resistance/DC: Dielectric Constant

As can be seen from Table 1, in the case of Comparative Example 1 in which dysprosium (Dy) is added in an amount of 0.932 mol % based on 100 mol % of the base metal main ingredient, a dielectric constant DC is lower and insulation resistance IR is high.

In the case of Comparative Example 2 in which a content of praseodymium (Pr) is higher than 0.699 mol % based on 100 mol % of the base material main ingredient, a semiconductorization tendency is exhibited, a dissipation factor DF is problematic, and insulation resistance IR is deteriorated.

On the other hand, in Embodiments 1 to 3 of the present disclosure, contents of dysprosium (Dy) and praseodymium (Pr) are 1.0 mol % or less based on 100 mol % of a base material main ingredient and the content of praseodymium (Pr) satisfies 0.233 mol %≤Pr≤0.699 mol %. A high-k dielectric constant may be ensured and reliability improvement such as insulation resistance improvement, or the like, may be achieved.

Figure 3:
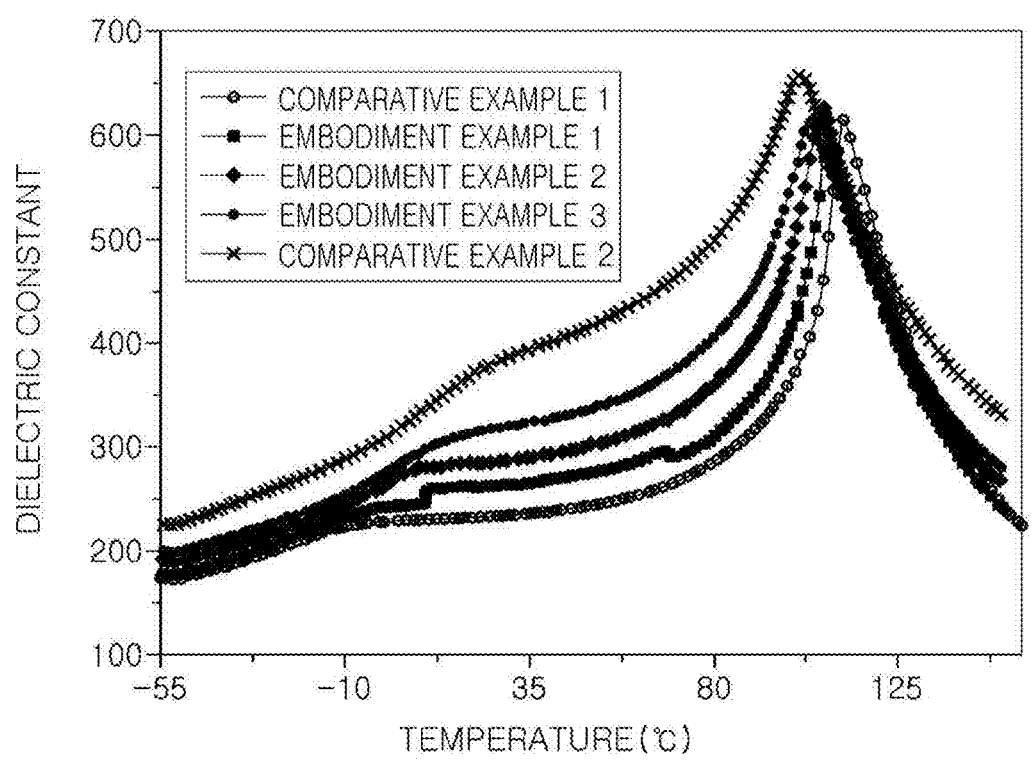
FIG. 3 is a graph illustrating temperature-dependent dielectric constant results according to an embodiment in the present disclosure and a comparative example.

FIG. 3 is a graph illustrating temperature-dependent dielectric constant results according to an embodiment in the present disclosure and a comparative example.

As can be seen from FIG. 3, in the case of Examples 1 to 3 in which a content of praseodymium (Pr) satisfies 0.233 mol %≤Pr≤0.699 mol % based on 100 mol % of a base material main ingredient, an increase in a temperature-dependent dielectric constant is greater than that of Comparative Example 1.

In the case of Comparative Example 2 in which a content of praseodymium (Pr) 0.932 mol % based on 100 mol % of the base material main ingredient, a dielectric constant is high but semiconductorization tendency is exhibited to decrease insulation resistance. Thus, reliability is problematic.

As described above, a dielectric ceramic composition, included in a dielectric layer inside a ceramic body, may include praseodymium (Pr), a novel rare-earth element, as an accessory ingredient, and a content thereof may be controlled to secure a high-k dielectric constant and reliability improvement such as insulation resistance improvement may be achieved.

While example embodiments have been shown and described above, it will be apparent to those skilled in the art that modifications and variations could be made without departing from the scope of the present disclosure as defined by the appended claims.

What is claimed is:

1. A multilayer ceramic capacitor comprising:
   a ceramic body comprising dielectric layers and first and second internal electrodes disposed to face each other with respective dielectric layers interposed therebetween; and
   a first external electrode and a second external electrode disposed on external surfaces of the ceramic body, the first external electrode being connected to the first internal electrode and the second external electrode being connected to the second internal electrode,
   wherein the dielectric layers comprise dielectric grains comprising a dielectric ceramic composition,
   the dielectric ceramic composition comprises a barium titanate ($BaTiO_3$)-based base material main ingredient and an accessory ingredient, the accessory ingredient comprising dysprosium (Dy) and praseodymium (Pr) as first accessory ingredients,
   a content of the Pr satisfies 0.233 mol % ≤ Pr ≤ 0.699 mol %, based on 100 mol % of the barium titanate base material main ingredient, and
   the first accessory ingredients further comprise an oxide or carbonate comprising lanthanum (La), and a grain boundary between the dielectric grains comprises a region in which La is disposed.

2. The multilayer ceramic capacitor of claim 1, wherein a total content of the Dy and the Pr is less than or equal to 1.0 mol %, based on 100 mol % of the barium titanate base material main ingredient.

3. The multilayer ceramic capacitor of claim 1, wherein a content of La is greater than or equal to 0.233 mol % and less than or equal to 0.699 mol % based on 100 mol % of the barium titanate-based base material main ingredient.

4. The multilayer ceramic capacitor of claim 1, wherein the dielectric ceramic composition comprises 0.1 mol % to 2.0 mol % of a second accessory ingredient based on 100 mol % of the barium titanate base material main ingredient, the second accessory ingredient comprising an oxide or carbonate comprising at least one of manganese (Mn), vanadium (V), chromium (Cr), iron (Fe), nickel (Ni), cobalt (Co), copper (Cu), or zinc (Zn).

5. The multilayer ceramic capacitor of claim 1, wherein 0.001 mol % to 0.5 mol % of an additional accessory ingredient based on 100 mol % of Ti of the barium titanate base material main ingredient, the additional accessory ingredient comprising an oxide or carbonate comprising a fixed-valence acceptor element of magnesium (Mg).

6. The multilayer ceramic capacitor of claim 1, wherein the dielectric ceramic composition comprises 0.001 mol % to 4.0% mol of an additional accessory ingredient based on 100 mol % of the barium titanate base material main ingredient, the additional accessory ingredient comprising an oxide of at least one of silicon (Si) or aluminum (Al), or a glass compound comprising Si.

7. The multilayer ceramic capacitor of claim 1, wherein each of the dielectric layers has a thickness of 0.4 μm or less.

8. The multilayer ceramic capacitor of claim 1, wherein each of the first and second internal electrodes has a thickness of 0.4 μm or less.

9. The multilayer ceramic capacitor of claim 1, wherein each of the first and second internal electrodes has a thickness of 0.4 μm or less, and
   wherein each of the dielectric layers has a thickness of 0.4 μm or less.

10. The multilayer ceramic capacitor of claim 1, wherein a size of the multilayer ceramic capacitor is 1005 (length× width, 1.0 mm×0.5 mm) or less.

11. A multilayer ceramic capacitor comprising:
    a ceramic body comprising dielectric layers and first and second internal electrodes disposed to face each other with respective dielectric layers interposed therebetween; and
    a first external electrode and a second external electrode disposed on external surfaces of the ceramic body, the first external electrode being connected to the first internal electrode and the second external electrode being connected to the second internal electrode,
    wherein the dielectric layers comprise dielectric grains comprising a dielectric ceramic composition,
    the dielectric ceramic composition comprises a base material main ingredient including one selected from the group consisting of $BaTiO_3$, $(Ba_{1-x}Ca_x)(Ti_{1-y}Ca_y)O_3$ (where $0 \le x \le 0.3$ and $0 \le y \le 0.1$), $(Ba_{1-x}Ca_x)(Ti_{1-y}Zr_y)O_3$ (where $0 \le x \le 0.3$ and $0 \le y \le 0.5$), and $Ba(Ti_{1-y}Zr_y)O_3$ ($0 \le y \le 0.5$) and an accessory ingredient, the accessory ingredient comprising dysprosium (Dy) and praseodymium (Pr) as first accessory ingredients, and
    wherein a content of the Pr satisfies 0.233 mol % ≤ Pr ≤ 0.699 mol %, based on 100 mol % of the base material main ingredient, and
    a total content of the Dy and the Pr is less than or equal to 1.0 mol % based on 100 mol % of the base material main ingredient, and
    the first accessory ingredients further comprise an oxide or carbonate comprising lanthanum (La), and a grain boundary between the dielectric grains comprises a region in which La is disposed.

12. The multilayer ceramic capacitor of claim 11, wherein the dielectric ceramic composition comprises 0.1 mol % to 2.0 mol % of a second accessory ingredient based on 100 mol % of the base material main ingredient, the second accessory ingredient comprising an oxide or carbonate comprising at least one of manganese (Mn), vanadium (V), chromium (Cr), iron (Fe), nickel (Ni), cobalt (Co), copper (Cu), or zinc (Zn).

13. The multilayer ceramic capacitor of claim 12, wherein 0.001 mol % to 0.5 mol % of an additional accessory ingredient based on 100 mol % of Ti of the base material main ingredient, the additional accessory ingredient comprising an oxide or carbonate comprising a fixed-valence acceptor element of magnesium (Mg).

14. The multilayer ceramic capacitor of claim 12, wherein the dielectric ceramic composition comprises 0.001 mol % to 4.0% mol of an additional accessory ingredient based on 100 mol % of the base material main ingredient, the additional fourth accessory ingredient comprising an oxide of at least one of silicon (Si) or aluminum (Al), or a glass compound comprising Si.

15. The multilayer ceramic capacitor of claim 11, wherein each of the dielectric layers has a thickness of 0.4 μm or less.

16. The multilayer ceramic capacitor of claim 11, wherein each of the internal electrodes has a thickness of 0.4 μm or less.

17. The multilayer ceramic capacitor of claim 11, wherein the content of La is greater than or equal to 0.233 mol % and less than or equal to 0.699 mol % based on 100 mol % of the base material main ingredient.

18. The multilayer ceramic capacitor of claim 17, wherein a size of the multilayer ceramic capacitor is 1005 (length× width, 1.0 mm×0.5 mm) or less.

19. The multilayer ceramic capacitor of claim 11, wherein at least one of the first and second internal electrodes has an average thickness of 0.4 μm or less.

* * * * *